June 5, 1951

P. F. WILBER

RECORD PLAYER 2,555,910

Filed May 7, 1945

4 Sheets-Sheet 1

INVENTOR.

Paul F. Wilber

BY

Popp and Popp

ATTORNEYS

June 5, 1951 P. F. WILBER 2,555,910

RECORD PLAYER

Filed May 7, 1945 4 Sheets-Sheet 2

INVENTOR.
Paul F. Wilber
BY
Popp and Popp
ATTORNEYS

June 5, 1951 P. F. WILBER 2,555,910

RECORD PLAYER

Filed May 7, 1945 4 Sheets-Sheet 3

INVENTOR.
Paul F. Wilber
BY
Popp and Popp
ATTORNEYS

June 5, 1951

P. F. WILBER 2,555,910

RECORD PLAYER

Filed May 7, 1945

4 Sheets-Sheet 4

INVENTOR.

Paul F. Wilber

BY

Popp and Popp

ATTORNEYS

UNITED STATES PATENT OFFICE 2,555,910

RECORD PLAYER

Paul F. Wilber, Binghamton, N. Y.

Application May 7, 1945, Serial No. 592,343

1 Claim. (Cl. 274—10)

This invention relates to a machine for playing disk type phonograph records and more particularly to a machine which automatically plays a succession of such records on both faces thereof, the machine forming the subject of the invention being also adapted, however, for the playing of records singly under manual control; for playing the succession of records each on one face only; and for manual rejection of the playing of any face of any record as may be desired.

This application is an improvement upon the application for patent of William A. Lynch for Method and Machine for Playing Disk-Type Phonograph Records, Serial No. 559,716, filed October 21, 1944.

In common with this Lynch application, one of the principal objects of the invention is to provide such apparatus which does not require an increase in the size of the cabinet, as compared with a drop record player playing a succession of records from one side only, and in which the apparatus forming the subject of the invention does not interfere with the free loading, unloading or other operations.

Also in common with the said Lynch application, another object of the invention is to provide a simple and direct means of effecting the necessary reversal in rotation of the record when played from its opposite sides, such means also serving to support the record when played from one side and to transfer the record to its position for playing on the other side.

Also in common with said Lynch application, another aim of the invention is to provide such a mechanism for playing both sides of a succession of disk records which is adapted to a large number of different standard types of automatic record players, particularly of the type known as the drop record type.

A particular object of the invention is to provide, in a machine in which one record is driven from another record or from the empty turntable, a drive wherein the driven record is rotated at the same rate of speed as the driving record or turntable in spite of a limited amount of slippage in the drive and in spite of the increased load on the turntable motor. By this means the driven record is played at the same speed as the record on the turntable thereby to play the faces of all records at the pitch in which they were recorded.

Another object is to provide, in such a machine in which one record is driven from another record or from the empty turntable, a drive wherein the driven record is held in one position and is restrained by the drive from wandering in its playing plane. This not only improves the reproduction but reduces hole wear if the driven record is centered by a center post.

Another object is to provide, in such a machine in which one record is driven from another record or from the empty turntable by retractable wheels interposed between the driving record or turntable and the driven record, a tire for the retractable wheels by which slippage is reduced to a minimum; by which wear upon the records and tires is reduced to a minimum; and in which separate driven and driving faces are provided on the tire.

Another object of the invention is to provide such apparatus which does not require substantial alteration of any of a number of standard types of drop record players in converting the same to a machine which will play the same records from both faces thereof.

Another object of the invention is to provide such a machine which is gentle in its action and operates with the minimum wear upon the record as well as with the minimum likelihood of breaking or otherwise injuring the record.

Another object of the invention is to provide such apparatus which is extremely low in cost and permits the manufacture and sale of the drop record type of changer embodying the invention at substantially the same price as a similar machine which automatically plays the records from only one side thereof.

Another important object of the invention is to provide such an apparatus which is extremely simple and rugged in construction and will stand up under conditions of severe and constant use without getting out of order or requiring repairs.

Further objects and advantages will appear from the following description and drawings in which.

Figures 1, 2:
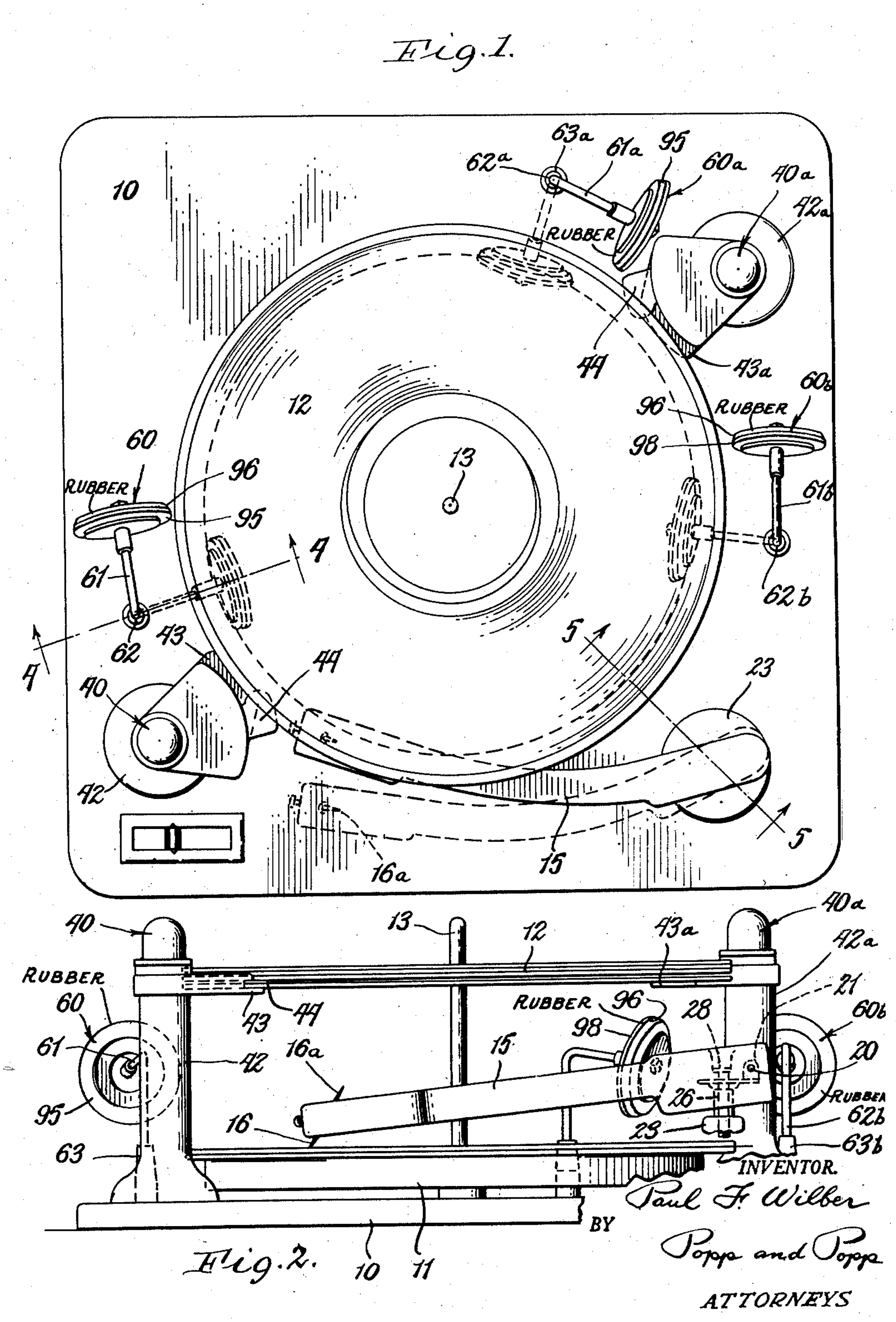
Fig. 1 is a top plan view of the record changer embodying my invention.
Fig. 2 is a fragmentary side elevation thereof.

While the invention can be incorporated in record changers varying widely in construction and operation, the record changer shown in the drawings represents the type of record changer illustrated in said Lynch patent application Serial No. 559,716 in which the operating parts are mounted on a supporting plate or bed 10 which can be built into the cabinet of the record changer. A turntable 11 for receiving the records 12 is shown as rotatably mounted on the supporting plate or bed 10, the turntable having an axial shaft 13 fixed thereto and extending through the bed or supporting plate 10 and suitably journaled therein for this purpose. The turntable is shown as being rotated in the proper clockwise direction to play the upper face of a record 12 thereon by an electric motor 14 which can drive the turntable 11 from its rim in the usual and well known manner.

The records 12 on or above the turntable 11 are shown as played by a pickup at the outer end of a tone arm 15. For the purpose of the invention the pickup is shown as having one stylus 16 extending downwardly and another stylus 16*a* extending upwardly. While each stylus is shown as being part of a double-pointed needle, it will be understood that each could be in the form of a jewel stylus forming a part of one or two pickups.

Figure 5:
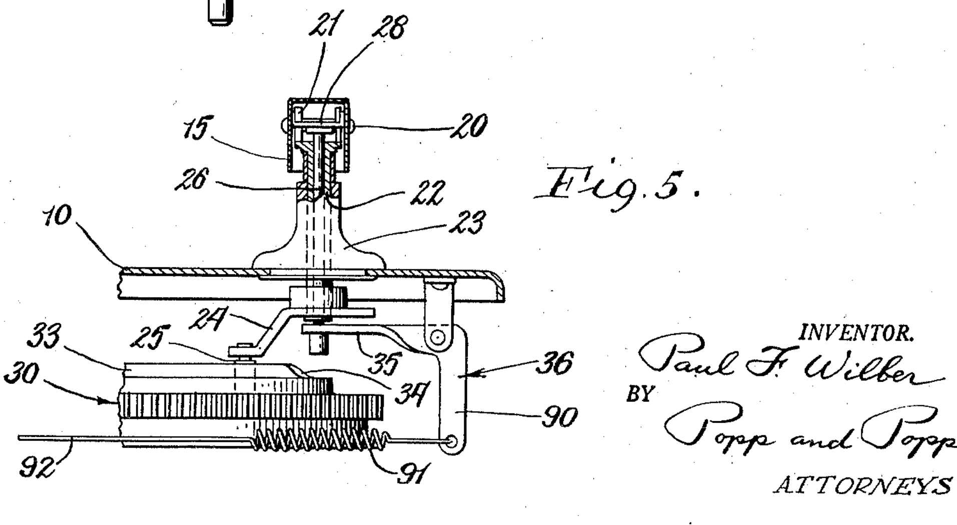
Fig. 5 is a fragmentary sectional view, taken on line 5—5, Fig. 1.

The opposite end of the tone arm is shown as mounted, by a horizontal pivot pin 20, on a pair of ears 21 projecting upwardly from a supporting post 22, this post being suitably journaled in a support 23 carried by the bed or supporting plate 10. As best shown in Fig. 5, the lower end of this post 22 projects below the supporting plate 10 and has fixed thereto an arm 24 carrying a roller 25 at its end, this arm being moved to swing the tone arm out to permit of record changing and to move the tone arm horizontally to proper playing position as hereinafter described. To move the tone arm vertically in engaging it with or disengaging it from the proper record, a vertically sliding pin 26 is arranged in the post 22, the upper end of this vertically sliding pin engaging a bracket 28 provided within the tone arm 15 between its pivotal mounting 20 and its free end so that raising the pin lifts the free end of the tone arm.

The tone arm 15 is controlled by a cam disk or gear wheel 30 which is rotatably mounted on the underside of the supporting plate or bed 10. The periphery of this cam disk or gear wheel is provided with gear teeth which are adapted to mesh with the teeth of a pinion 31 fast to the lower end of the turntable shaft 13. At diametrically opposite sides the gear wheel 30 is mutilated or unprovided with teeth, as indicated at 32. When either stylus of the tone arm is brought to playing position, one of these toothless or mutilated segments of the gear wheel 30 is in register with the pinion 31 on the turntable shaft. Consequently during the playing of the record the gear wheel 30 is out of engagement with the pinion 31 on the rotating turntable shaft 13 and the gear wheel 30 remains stationary. When the stylus enters the central eccentric groove of the record means (not shown) are provided which effect engagement between the pinion 31 and the teeth of the gear wheel 30 in consequence of which this gear wheel is rotated one-half of a revolution until the pinion 31 encounters the opposite toothless or mutilated portion 32 of the gear wheel when the gear wheel is again brought to rest.

During the initial part of each such half revolution of the gear wheel 30, the salient part 33 of a face cam 34 on the cam wheel 30 comes into register with the vertically sliding pin 26 of the pickup arm, one arm 35 of a bell crank lever being interposed between the lower end of this sliding pin 26 and the face of the cam 34, as best shown in Fig. 5, for a purpose which will presently appear. This salient part 33 of the face cam 34 provides a neutral position for the tone arm so that when the tone arm pin 26 and the arm 35 of the bell crank lever 36 is in engagement with this salient part, both styluses of the tone arm are out of engagement with a record. Thus upon completion of the playing of the upper face of the record 12 on the turntable 11 the engagement of the corresponding salient part 33 of the face cam 34 with the bell crank lever 36 and sliding pin 26 operates to move this pin and the free end of the tone arm 15 upwardly out of engagement with the record and to a neutral position where it can be swung horizontally outward to an inoperative position.

Figure 3:
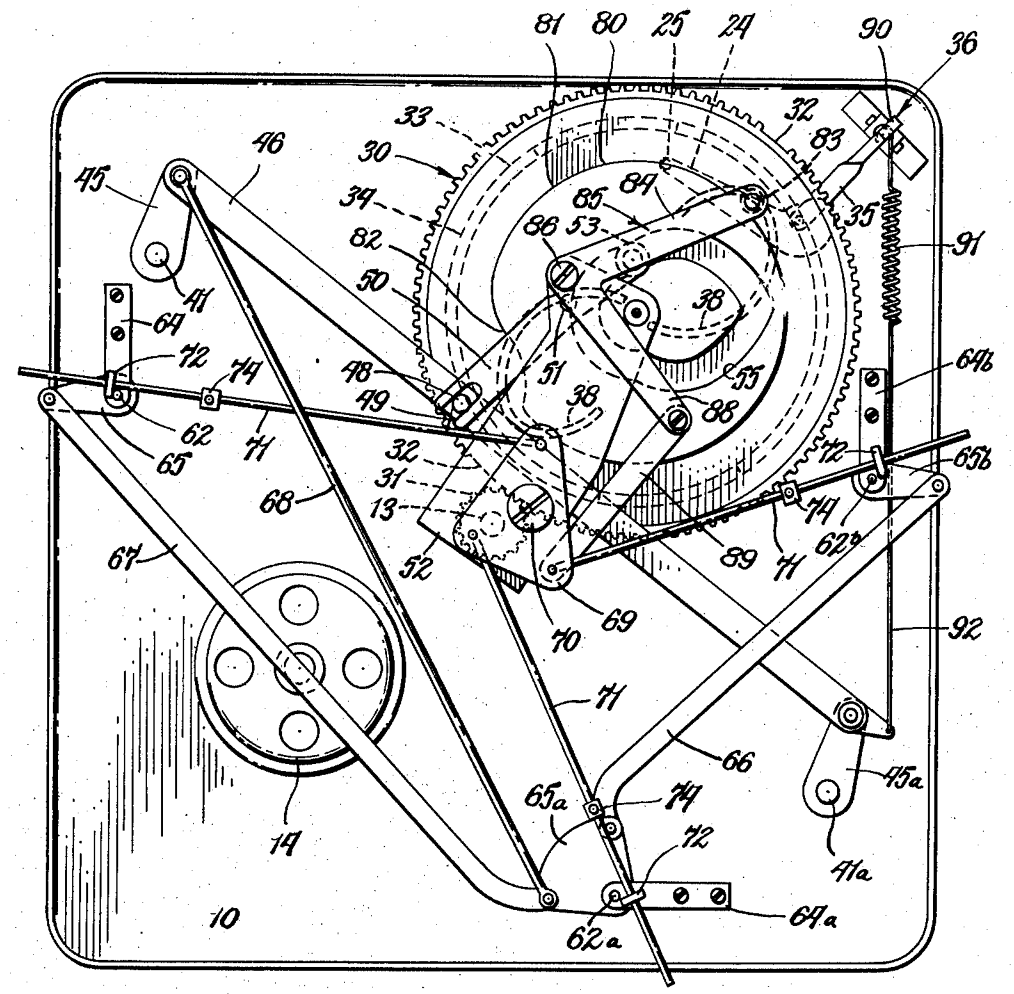
Fig. 3 is a bottom plan view.

To effect such horizontally outward swing of the tone arm to an inoperative position, the cam disk or gear wheel 30 is provided on its upper face and on opposite sides of its axis with counterpart cam ridges 38, the cam faces of which face radially outward and are adapted to engage the roller 25 on the arm 24 fast to the tone arm post 22, as best shown in Fig. 5. As best shown in Fig. 3, the two counterpart cams 38 together are generally S-shaped and are formed so that, following the action of a salient portion 33 of the cam 34 in moving the tone arm vertically to a neutral position, the corresponding cam 38 engages the roller 25 to swing the arm 24, tone arm post 22 and tone arm 15, the movement of the tone arm being from the center of the record to a position beyond the outer edge of the record. At this extreme position the roller 25 is also engaged by the radially inward face of the face cam 34 which controls the elevation of the tone arm, the tone arm being thereby momentarily locked in its extreme outward inoperative position. Following this the roller 25 passes beyond the extremity of the cam 38 and the tone arm is free to be swung horizontally inward to initial record playing position by a positioning means (not shown).

The record player plays the opposite faces of succession of records and to this end a stack of the records 12 is threaded on the upper extremity of the turntable post or shaft 13 and is supported in this inoperative position by a pair of record release or escapement devices, commonly called slicers, which are actuated to drop one record at a time from the bottom of the stack for playing. These escapement devices are substantially identical and are arranged on diametrically opposite sides of the turntable 11 the same reference numerals being employed, the corresponding parts of the one escapement being distinguished from the other by the suffix "*a*." Each comprises a head 40, 40*a* fast to a vertical shaft 41, 41*a* carried by a post 42, 42*a* supported by the plate or bed 10, the shafts 41, 41*a* extending below this plate, as best shown in Fig. 3. Each head has a fixed horizontal blade 43, 43*a* projecting outwardly therefrom in opposed relation to the opposite escapement device and a flexible horizontal blade 44, 44*a* which is arranged substantially one record thickness above the fixed blade 43, 43*a* and in offset but overlapping relation thereto. The heads 40, 40*a* are oscillated in opposite directions to release a record, the stack of records being supported by the blades 43, 43*a* and 44, 44*a*. In one extreme position the stack of records is supported by the fixed blades 43, 43*a*. As the heads 40, 40*a* are rotated toward their opposite extreme positions the flexible blades 44, 44*a* cut between the lowest record and the next succeeding record. On the continued movement of the heads 40, 40*a*, the fixed blades 43, 43*a* pass from under the lowermost record and hence this lowermost record is free to drop, the remainder of the stack of records being, however, supported on the flexible blades 44, 44*a*. On the retrograde oscillation of the heads 40, 40*a*, the now lowermost record supported by the flexible blades 44, 44*a* is dropped onto the fixed blades 43, 43*a* for repetition of the cycle. It will therefore be seen that each time the shafts 41, 41*a* of the escapement devices are oscillated the lowermost record of the stack on the heads 40, 40*a* is dropped toward the turntable 11.

To effect such oscillation of the escapement or slicer shafts 41, 41*a*, an arm 45 is fast to the lower end of the shaft 41 and an arm 45*a* fast to the lower end of the shaft 41*a* and these arms 45, 45*a* are cross connected by a link 46. Near its center this link 46 carries a pin 48 which is arranged in a slot 49 provided in the bifurcated or forked end of a horizontally swinging lever 50. This lever is pivoted at 51 to a stationary plate 52 which is suitably fixed to the supporting plate or bed 10 and this plate is arranged under the turntable shaft 13 and the adjacent part of the cam disk or gear wheel 30. The pivotal mounting 51 for the lever 50 is near its center and the opposite end of this lever 50 is provided with a roller 53 which projects upwardly therefrom into a figure 8 cam groove 55 provided eccentrically on the under side of the cam disk or gear wheel 30. With the figure 8 form of cam groove as shown it will be seen that each time the cam disk or gear wheel 30 is rotated a complete revolution, the salient and receding portions of the cam groove 55 through the roller 53 swings the arm 50 about its pivotal mounting 51 thereby to reciprocate the link 46 longitudinally. This movement of the link 46 is transmitted through the levers 45, 45*a* and shafts 41, 41*a* to oscillate the escapement heads 40, 40*a* in unison and thereby drop the lowermost record from the stack supported by the blades of these escapement heads, as previously described.

Means are provided for receiving, rotating, playing and releasing a record dropped from the escapement device, particularly, but not necessarily, to permit of playing of both sides of a succession of records. These means are shown as constructed as follows:

Three rubber tired wheels 60, 60*a*, 60*b* are provided, each of which is mounted for free rotation on the end of a corresponding arm 61, 61*a*, 61*b*, this arm forming a continuation of the upper end of a corresponding vertical sliding post 62, 62*a*, 62*b* which is slidingly journaled in a corresponding vertical bearing 63 carried by the supporting bed or plate 10. Each arm 61, 61*a*, 61*b* is arranged at a 77.5° angle to the post 62, 62*a*, 62*b* so that it is arranged at a 12.5° angle to the horizontal for a purpose which will presently appear. It will be seen from Fig. 4 that each post 62, 62*a*, 62*b* extends through its bearing 63, 63*a*, 63*b* and that this bearing permits its wheel 60, 60*a*, 60*b* to be raised and lowered from one dotted line position to the full line position shown and also permits the post to be swung from the full to the second dotted line position shown in this figure. The three posts 62, 62*a*, 62*b* are arranged adjacent the rim of the turntable 11 at three points around this rim so that the wheels 60, 60*a*, 60*b* can be swung to a position in which their axes intersect each other at the axis of rotation of the turntable so as to be capable of supporting and rotating a record on the turntable post 13 when dropped by the slicers or escapement devices 40, 40*a*.

To rotate the posts 62, 62*a*, 62*b* so as to move the wheels 60, 60*a*, 60*b* from their operative position in which their axes intersect one another to their inoperative position wholly outside of the field of the records dropped by the slicers or escapement devices 40, 40*a*, the lower extremity of each of the posts 62, 62*a*, 62*b* is shown as slidingly journaled in a bearing bracket 64, 64*a*, 64*b* carried by the supporting plate or bed 10 and above these bearing brackets two of the sliding posts 62, 62*b* are shown as provided with fixed arms 65, 65*b* and the third sliding post is provided with a fixed arm 65*a*, this latter arm 65*a* being in the form of a segment. So that all of the posts 62, 62*a*, 62*b* are rotated to and from their operative positions in unison, one arm 65*b* is connected to one corner of the segmental arm 65*a* by a link 66 and the other arm 65 is connected to the other corner of the segmental arm 65*a* by a link 67. These links 66 and 67 are shaped so as not to interfere with any of the other mechanism in their operation.

The wheels 60, 60*a*, 60*b* are moved horizontally into operative position to receive a record dropped by the slicers or escapements 40, 40*a* and the swinging of the posts 62, 62*a*, 62*b* is in step with the movement of the slicers. This movement of all of the posts 62, 62*a*, 62*b* is shown as effected by the simple expedient of connecting the arm 65*a* of one of the post 62*a* with the arm 45 of one of the slicer or escapement shafts 41 by a simple link 68.

Figure 4:
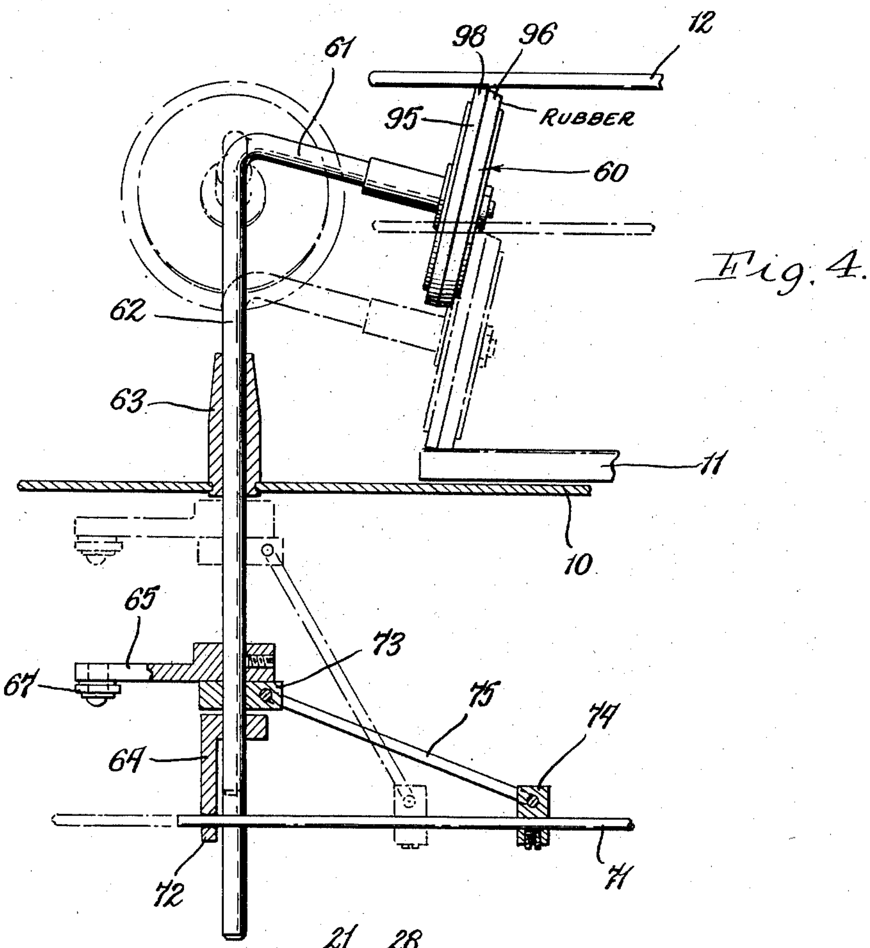
Fig. 4 is an enlarged fragmentary vertical sectional view, taken on line 4—4, Fig. 1.

The posts 62, 62*a*, 62*b* for the wheels 60, 60*a*, 60*b* are also moved vertically, the purpose of this being to elevate the wheels 60, 60*a*, 60*b* to receive a record from the slicers or escapements 40, 40*a*; to lower this record into engagement with the upwardly extending stylus 16*a* and at the same time to engage the wheels 60, 60*a*, 60*b* with the turntable 11 or the top record 12 thereon and thereby secure a reverse rotation of the record supported on the wheels 60, 60*a*, 60*b*; and to raise the record from engagement with the stylus 16*a* and the wheels from driving engagement with the turntable 11 or the top record thereon so that the wheels 60, 60*a*, 60*b* can be swung out to drop the record onto the turntable 11 for playing its upper face by the stylus 16. To effect this raising and lowering of the posts 62, 62*a*, 62*b*, means are provided which are preferably constructed as follows:

The numeral 69 represents a triangular plate which is supported by a vertical pivot 70 secured to the underside of the stationary plate 52 and three rods 71 are pivotally secured to the three corners of this triangular plate 69, the other end of each of these rods being guided in an ear 72 depending from a corresponding bearing bracket 64, as best shown in Figs. 3 and 4, this rod being thereby arranged adjacent the corresponding post 62. A collar 73 surrounds each post 62, 62*a*, 62*b* and bears against the under side of its arm 65, 65*a*, 65*b*, this collar being loose so as not to interfere with the swinging of the post. A collar 74 is fast to each rod 71 and a link 75 connects each collar 74 with the corresponding collar 73. It will therefore be seen that when the triangular plate 69 is rotated counterclockwise, as viewed in Fig. 3, the three rods 71 are moved longitudinally outward, this movement, through the links 75, raising the posts 62, 62*a*, 62*b* from the dotted to the full line position shown in Fig. 4. Reverse rotation of the triangular plate 69, of course, effects a lowering of the posts 62, 62*a*, 62*b* to the dotted line position shown in Fig. 4.

To effect this oscillation of the triangular plate 69 in proper sequence, the cam disk or gear wheel 30 is shown as provided on its underside with a cam 80, the effective salient and receding faces 81 and 82 of which face radially outward. These salient and receding faces 81 and 82 are engaged by a roller 83 extending upwardly from one arm 84 of a bell crank lever 85, this bell crank lever being secured at its center by a pivot 86 to the underside of the stationary plate 52. The other arm 88 of the bell crank lever is connected to one corner of the triangular plate 69 by a link 89. It will be seen that the oscillation of the bell crank lever 85 by the salient and receding faces 81 and 82 of the cam 80 is transmitted by the link 89 to effect a corresponding oscillation of the triangular plate 69 thereby to effect the raising and lowering of the wheels 60, 60*a*, 60*b* as previously described.

The record player is adapted to play the underside of the record rotatably supported on the wheels 60, 60*a*, 60*b*. To do this it is necessary to bias the tone arm 15 upwardly to engage the stylus 16*a*. For this purpose the arm 90 of the bell crank lever 36 is shown as connected by a spring 91 and wire 92 to one extremity of the link 46 connecting the two slicer or escapement members 40, 40*a*. After dropping a record from the bottom of the stack on the escapement or slicers 40, 40*a*, the continued movement of the escapement mechanism, through the wire 92, tenses the spring 91 to raise and bias the horizontal arm 35, and hence the pin 26 and tone arm 15, upwardly. At this time the tone arm stylus 16*a* is positioned at the starting groove of the record and as the cam 80 effects the lowering of the wheels 60, 60*a*, 60*b* to engage the turntable 11, or uppermost record thereon, the record on the wheels 60, 60*a*, 60*b* is brought into engagement with the stylus 16*a* and moves the tone arm downwardly against the resistance of the spring 91 to provide the necessary stylus pressure to properly play the underside of the record supported on the wheels 60, 60*a*, 60*b*.

The present invention is directed to the form and mounting of the wheels 60, 60*a*, 60*b* which act as the turntable for the record being played from its underside; as the means for receiving records from the overhead stack and transferring them to the turntable; as the motion transmitting and drive means particularly to drive the record supported thereon in a direction reverse to the record supported on the turntable and which forms the driving surface for the wheels; and as the stylus engaging means. In acting as the motion transmitting means in driving the record supported thereon from the upper surface of the record on the turntable 11, or from the empty turntable, as shown by dotted lines in Fig. 4, there is a certain amount of slippage of the wheels 60, 60*a*, 60*b*, particularly in the driving contact between the wheels 60, 60*a*, 60*b* and the driving record supported on the turntable 11. Further, if the motor 14 is designed to rotate the turntable 11 and the record supported thereon at the speed at which the record was recorded, when the additional load of the three wheels 60, 60*a*, 60*b* and another record supported thereon is imposed on the motor 14, the speed of this motor may be reduced. From either cause the record supported and rotated by the three wheels 60, 60*a*, 60*b* tends to rotate at a slower speed than a record supported on the free turntable 11. Hence the record supported by the wheels 60, 60*a*, 60*b* is played at a slower speed and lower pitch than the records carried by the free turntable 11.

To compensate for such slippage and increased load upon the motor 14, the arms 62, 62*a*, 62*b* of each post 61, 61*a*, 61*b* incline downwardly from the post, the angle of such inclination having been determined as being in the order of 12.5° from the horizontal. The axes of these arms intersect one another in the playing position of the wheels 60, 60*a*, 60*b* and hence in this playing position it wil be seen that these wheels slant inwardly to describe a smaller circle on the supported or driven record than on the supporting record or turntable 11. Hence, when the wheels 60, 60*a*, 60*b* are resting on a driving record on the turntable 11 and supporting another or driven record, it will be seen that the angularity of the wheels 60, 60*a*, 60*b* tends to provide a stepup transmission tending to drive the driven record faster than the driving record. The angularity of the wheels 60, 60*a*, 60*b* is selected to just compensate for the slippage and increased load on the motor when the wheels 60, 60*a*, 60*b* are operative in supporting a record being played.

The rubber tires 95 of the wheels 60, 60*a*, 60*b* are also formed to function with minimum slippage and wear. To this end the periphery of each wheel, on the side facing the axis of rotation of the records, is beveled at an angle of 12.5° to the axis of the wheels to provide a wide beveled face 96 which has full line contact with the upper face of the driving record on the turntable 11. The rest 98 of the periphery of the tire engages the underside of the record supported by the wheels. As a result one face of the tire of each wheel 60, 60*a*, 60*b* is a broad driven face engaging the face of the driving record on the turntable and the other face is a driving face engaging the underside of the driven record.

A further important feature of the angularity of the wheels 60, 60*a*, 60*b* resides in the fact that this angularity tends to crowd the driven record to remain in one position and hence restrains the record from wandering in its playing plane. Thus, without the angularity of the wheels, the record supported on these wheels would tend to wander within the limits permitted by the centrepost 13. This not only interfered with the quality of the reproduction but also resulted in excessive centerhole wear on the record. With the inclined wheels 60, 60*a*, 60*b* if the record has an excessively large centerhole and is received in eccentric relation to the center post, the wheels 60, 60*a*, 60*b* tend to crowd it so as to retain it in this position so that no further hole wear takes place while the record is being played supported on the wheels 60, 60*a*, 60*b*.

*Operation*

Figures 6, 7:
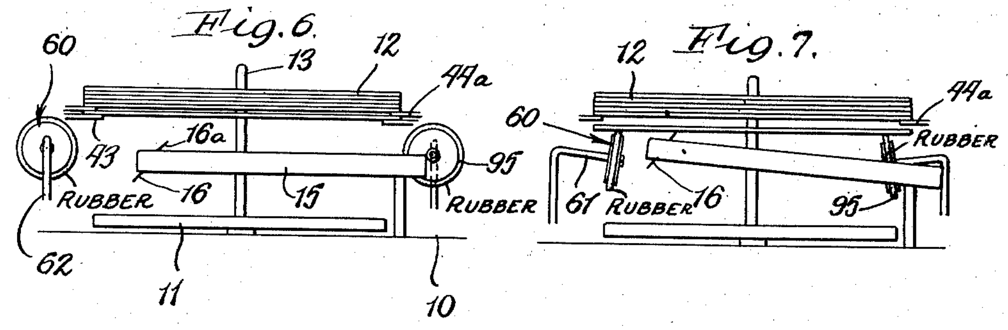
Figs. 6–11 are diagrammatic side elevational views illustrating the sequence of operation of the exposed parts of the record changer in playing both sides of a succession of records stacked on the record changer.

Referring more particularly to the diagrammatic views, Figs. 6–11, which illustrate the sequence of operations of the record player, in Fig. 6 the apparatus is in starting position with the wheels 60, 60*a*, 60*b* raised and swung to a position out of the record zone and with the tone arm 15 held with each stylus in vertical alinement with the starting grooves of the records 12, a stack of which is shown as having been threaded on the turntable shaft 13 and supported by the blades 43, 43$a$ and 44, 44$a$ of the two slicer or escapement heads 40, 40$a$. No record is shown on the turntable 11 although the presence of a stack of records on the turntable 11 would not affect the operation except that the wheels 60, 60$a$, 60$b$ would be driven from the topmost record 12 of this stack instead of from the turntable directly and the record on the wheels 60, 60$a$, 60$b$ would, of course, be played at a higher elevation. At this time the pinion 31 on the turntable shaft 13 is in engagement with the teeth of the cam disk or gear wheel 30 and hence the rotation of the turntable by its motor 14 immediately starts the rotation of the cam disk or gear wheel 30.

The cams on this cam disk or gear wheel 30 move the parts toward the position shown in Fig. 7. Thus, the roller 53 at the end of the forked arm 50 is moved into the salient portion of the figure 8 cam groove 55, this swinging this forked lever 50 counterclockwise about its pivot pin 51, as viewed in Fig. 3, and reciprocating the link 46 to the right. This rotates the arms 45, 45$a$ on the escapement or slicer shafts 41, 41$a$ clockwise and pushes the rod 66 to the right. This rotates the segment 65$a$ counterclockwise to effect a corresponding rotation of the sliding post 62$a$ to which it is attached, and through the link 67 rotates one arm 65 and its post 62 counterclockwise and through the link 66 rotates the other arm 65$b$ and its post 62$b$ clockwise, as viewed in Fig. 3. Referring to Fig. 1, this rotation of the several posts swings the arms 61, 61$a$, 61$b$ at the upper ends of the posts 62, 62$a$, 62$b$ so that their axes intersect one another at the axis of the turntable shaft 13, and the wheels 60, 60$a$, 60$b$ are positioned as shown by dotted lines in Fig. 1, and beneath the stack of records 12 on the escapement or slicers 40, 40$a$, as shown in Fig. 7.

While this inward movement of the arms 61, 61$a$, 61$b$ and wheels 60, 60$a$, 60$b$ is progressing, the clockwise movement of the arms 45, 45$a$ connected by the link 46, as viewed in Fig. 3, effects a corresponding movement of the escapement or slicer shafts 41, 41$a$, thereby to rotate the escapement heads 40, 40$a$ counterclockwise, as viewed in the plan view, Fig. 1. This rotates these heads 40, 40$a$ so as to bring their flexible blades 44, 44$a$ between the lowermost and next higher record 12 of the stack and, when the heads 40, 40$a$ rotate far enough, their blades 43, 43$a$ pass from under the lowermost record and permit it to drop, the balance of the stack being supported by the flexible blades 44, 44$a$. Since at this time the wheels 60, 60$a$, 60$b$ have been brought to the position shown in Fig. 7, as just described, the lowermost record so released falls upon the surfaces 98 of these wheels 60, 60$a$, 60$b$.

The extreme movement of the link 46 (Fig. 3) to the right, in so swinging the wheels 60, 60$a$, 60$b$ to their operative positions and in actuating the escapement or slicer heads 40, 40$a$ to so release the lowermost record of the stack, puts tension on the wire 92 and spring 91. This in turn biases the upper or horizontal arm 35 (Fig. 5) of the bell crank lever 36 upwardly, thereby to move and yieldingly support the pin 26 and tone arm 15 to its elevated position shown in Fig. 7. It will be noted from Fig. 5, however, that while the tone arm 15 is so biased upwardly, the tone arm is free to be pressed downwardly against the resistance of this spring 91, the upper arm 35 of the bell crank lever 36 being unsupported except for this spring 91.

The continued movement of the cam disk or gear wheel 30 brings the roller 83 at the end of one arm 84 of the bell crank lever 85 into engagement with the receding portion 82 of the radially facing cam 80. This permits this bell crank lever 85 to oscillate clockwise, as viewed in Fig. 3, about its pivot 86 thereby, through the link 89, rotating the triangular plate 69 clockwise. This permitted clockwise rotation of the triangular plate 69 permits the rods 71 to move inwardly. Referring to Fig. 4, it will be seen that the inward movement of each rod 71 (to the right), through the angular link 75, permits the collar 73 to lower and, since each sliding post 62, 62$a$, 62$b$ is supported by its collar 73, each of these sliding posts 62, 62$a$, 62$b$ and the wheel carried thereby is permitted to lower.

The first result of this lowering movement of the wheels 60, 60$a$, 60$b$ is to effect engagement between the stylus 16$a$ and the starting groove on the underside of the record 12 supported on the wheels 60, 60$a$, 60$b$, this stylus being in proper register with this starting groove as previously described. The continued downward movement of the wheels 60, 60$a$, 60$b$ operates to move the tone arm 15 downwardly against the resistance of the spring 91 which biases it upwardly as previously described. This serves to provide the desired stylus pressure in playing the underside of the record on the wheels 60, 60$a$, 60$b$.

Figures 8, 9:
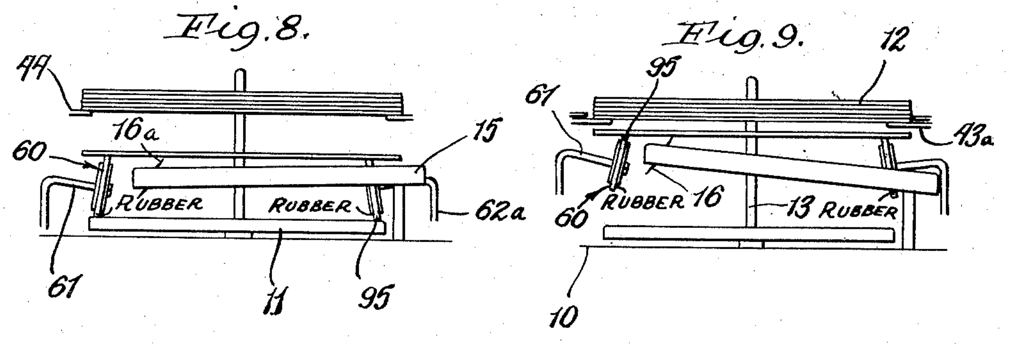

The final downward movement of the wheels 60, 60$a$, 60$b$ brings the surfaces 96 thereof into engagement with the turntable 11, as shown in Fig. 8 (or with the uppermost of a pile of records supported thereon) to be wholly supported thereby. This turntable is, of course, rotating clockwise and effects a corresponding rotation of the three wheels 60, 60$a$, 60$b$. These wheels thereby become motion reversing devices, the record 12 supported by these wheels being rotated in the reverse direction to the turntable 11 and at the same rate of speed. The record 12 supported by the wheels 60, 60$a$, 60$b$ is therefore rotated in the proper direction for playing its underside by the stylus 16$a$, the rubber tires on these wheels providing the necessary friction for driving these wheels from the turntable 11 or the uppermost record supported thereon and for driving the record 12 supported by these wheels 60, 60$a$, 60$b$. When this playing position of the parts is reached, the pinion 31 on the turntable shaft 13 encounters the mutilated or toothless part 32 of the gear wheel 30 and hence this cam disk or gear wheel remains stationary while the stylus 16$a$ traverses the groove of the record and moves the tone arm 15 toward the center thereof.

In this playing position of the parts it will particularly be noted that the wheels 60, 60$a$, 60$b$, by reason of their inclination, traverse a smaller circle on the driven or supported record than they do on the supporting record or empty turntable. These wheels thereby tend to step up the speed of rotation of the record supported thereby as compared with the speed of rotation of the turntable. This stepping up in speed is, however, calculated to just compensate for the slippage of the wheels 60, 60$a$, 60$b$ upon the driving record on the turntable and the driven or supported record plus the increased load imposed upon the motor 14 by the wheels 60, 60$a$, 60$b$ and record supported thereby. In other words, the stepping up effect of the wheels 60, 60$a$, 60$b$ is calculated so that the driven record supported thereby is driven at the same speed as the free turntable. Hence, the record supported and played on the wheels 60, 60$a$, 60$b$ is rotated at the same speed and has the same pitch as the record supported on the freely rotating turntable.

A further feature of the invention resides in the angular form of the faces 96 and 98 of the tires of the wheels 60, 60a, 60b. Thus the relatively broad faces 96 constitute the driven faces contacting the driving record on the turntable and have full bearing thereon. The other faces 98 serve as the driving faces rotatably supporting the driven record. These faces are separate and hence minimize wear and also make the wheels 60, 60a, 60b effective to step up the speed of the driven record without scuff or wear upon either the tires of the wheels 60, 60a, 60b or the records.

A further feature of the invention resides in the effect of the angularity of the wheels 60, 60a, 60b in preventing wandering of the record supported thereby and hence in reducing record hole wear by the center post 13. Thus, if the record has an enlarged hole, it will be held against one side or the other of the post 13 by the inclined wheels 60, 60a, 60b and will not be permitted to wander with resultant enlargement of this hole.

When the stylus 16a reaches the central eccentric groove provided on the underside of the record 12 supported on the rotating wheels 60, 60a, 60b, the gear 31 fast to the turntable shaft 13 is caused to reengage the teeth of the cam disk or gear wheel 30 thereby to rotate it a half revolution until the opposite mutilated or toothless part 32 of this gear wheel is reached and the pinion 31 again rotates idly while a record plays.

The first effect of this half rotation of the cam disk 30 is to cause the roller 83 of the bell crank lever 85 to ride up on the salient part 81 of the radially facing cam 80. This rotates the bell crank lever 85 counterclockwise about its pivot 86, as viewed in Fig. 3, and, through the link 89, effects a similar rotation of the triangular plate 69 about its pivot 70. This counterclockwise rotation of the triangular plate 69 pushes out each of the three rods 71 axially. As best shown in Fig. 4, this outward or to the left axial movement of each rod 71, through the link 75, pushes upwardly on the loose collar 73 thereby to raise the corresponding arm 65, 65a, 65b and the sliding post 62, 62a, 62b to which this arm is fast. The upward movement of each of the sliding posts 62 62a, 62b raises the wheels 60, 60a 60b carried thereby and disengages these wheels from the top of the turntable 11 so that these wheels 60, 60a, 60b and the record 12 supported thereon stop rotating. The continued upward movement of the sliding posts 62, 62a, 62b lifts the record 12 on its wheels 60, 60a, 60b above the highest point to which the stylus 16a can follow, this stylus and its tone arm still being biased upwardly by the spring 91. This position of the parts is illustrated in Fig. 9.

The rotation of the cam disk or gear wheel 30 also brings the receding portion of the figure 8 cam groove 55 into engagement with the roller at the end of the forked lever 50, this rotating this forked lever 50 clockwise about its pivot 51, as viewed in Fig. 3, and shifting the link 46 to the left.

The first effect of this retrograde movement of this link 46 to the left, as viewed in Fig. 3, is to relieve the tension on the wire 92 and spring 91, this releasing the bell crank lever 36 so that its horizontal arm 35 drops into engagement with the salient part 33 of the face cam 34 which at this time has been moved into axial alinement with the pin 26 which supports the tone arm 15. The tone arm is supported by this salient portion of the face cam 34 in a neutral vertical position in which position it can be swung outwardly to a position outside of the record zone. This is done by the corresponding cam 38 engaging the roller 25 at the end of the lever 24 fast to the post 22. This cam 38 swings the arm 24 outwardly or clockwise, as viewed in Fig. 3, and hence swings the tone arm 15 counterclockwise, as viewed in Fig. 1, to the full line position there shown.

The second effect of this retrograde movement of the link 46 to the left, as viewed in Fig. 3, is to effect a retrograde movement of the blades 43, 43a and 44, 44a of the two escapement or slicer heads 40, 40a in preparation for again dropping the lowermost record from the stack supported thereon.

Figures 10, 11:
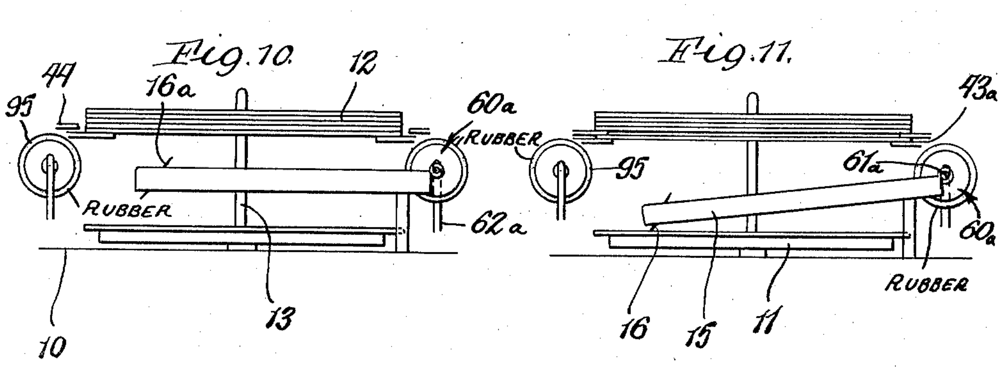

The third effect of this retrograde movement of the link 46 to the left, as viewed in Fig. 3, is to draw upon the link 68 thereby to rotate the segment shaped arm 65a clockwise. Through the links 66 and 67 this rotates the companion arms 65, 65b and the sliding posts 62, 62a, 62b to which these arms 65, 65a, 65b are fast, in the direction to swing their horizontal arms 61, 61a, 61b and the wheels 60, 60a, 60b carried thereby outwardly from the dotted to the full line position shown in Fig. 1. As the wheels 60, 60a, 60b move out of axial alinement with the turntable shaft 13, the opposing portions of their periphery present a widening funnel-shaped support for the edge of the record 12 carried by the wheels 60, 60a, 60b. As this funnel-shaped support widens through the spreading of the wheels 60, 60a, 60b the record is gently lowered until it reaches alinement with the axes of the wheels, when it drops from the opposing edges of the wheels 60, 60a, 60b onto the turntable 11, as shown in Fig. 10.

The tone arm 15 is then swung inwardly to position its stylus 16 above the starting groove on the upper face of the record, following which a receding portion of the face cam 34 comes into axial alinement with the pin 26 (Fig. 5). This permits the arm 35, pin 26 and tone arm 15 to lower and rest upon the upper face of the record on the turntable 11, as shown in Fig. 11, the stylus 16 entering the starting groove thereof. When this occurs the corresponding mutilated or toothless portion 32 of the cam disk or gear wheel 30 reaches the gear 31 on the turntable shaft 13 so that the cam disk or gear wheel 30 stops while the record is being played.

When the stylus 16 reaches the central eccentric groove of the record on the turntable the means (not shown) are actuated to reengage the pin 31 on the turntable shaft with the teeth of the cam disk or gear wheel 30 thereby to start the rotation of this cam disk. The initial rotation of the cam disk brings its corresponding cam 38 into engagement with the roller 25 to swing the arm 24, post 22, pin and tone arm 15 outwardly so that the tone arm is again brought to a position outside of the record zone. The tone arm 15 is then moved horizontally into alinement with the starting grooves of the records 12, this being the starting position assumed in this description and shown in Fig. 6.

This cycle of operations is then repeated, the stacked records on the slicers or escapements 40, 40a being played successively each first on its under face and then on its upper face until the entire stack has been played. The slicer or escapement heads 40, 40a are then manually swung to one side in a manner well known in the art and the played stack removed from the turntable and a fresh stack placed upon the escapement heads.

It will be noted that as the records pile up on the turntable 11 the records are played at progressively higher elevations. However, the upward biasing of the spring 91 insures proper engagement of the stylus 16a with the underside of the records on the wheels 60, 60a, 60b at all elevations and since the stylus 16 is engaged with the upper face of the records on the turntable 11 by merely lowering the tone arm no operating difficulty is encountered because of this condition.

It will be seen that the rollers 60, 60a, 60b which engage the under faces of the records have a number of important functions. They serve as a substitute for a turntable and could be used as such in any type of record player. They also serve as a rotatable support for the record which enables the playing of the undersides of the records. They also serve as a means for receiving the records from an overhead stack and supporting the records in an intermediate position in which they can be played. They also serve as a motion transmitting means, particularly to secure a reversal in the rotation of the record supported thereon by the simple expedient of engaging the wheels with a turntable arranged thereunder or with the uppermost record supported thereon. They also serve as a step-up transmission to effect a more rapid rotation of the supported record to compensate for slippage of the wheels as well as to compensate for the increased load on the driving motor by these wheels and the record supported thereby. Further, this speed step-up is provided by inclining the wheels in such manner that they tend to prevent wandering of the record with resultant hole wear where a center post is employed. The wheels 60, 60a, 60b also serve as a means for lowering a record into engagement with an upstanding stylus. The wheels also serve as a gentle record stacking means, the outward swing of the wheels providing an enlarging funnel-shaped support for the record carried by the wheels which gradually lowers the supported record until the wheels clear the edges of the record. The wheels also serve, of course, as a clutch to receive a non-rotating record, and to start and stop its rotation in the desired sequence. The wheels also act as a speed regulator inasmuch as the rotation of the record supported by the wheels is, because of the angularity of the wheels, the same as the speed of the turntable. Further, the wheels 60 act as automatic positioning means which operate to automatically position the record thereon at the proper playing elevation regardless of the number of records stacked upon the turntable.

As previously pointed out, the wheels 60, 60a and 60b are driven by contact with the upper face of the turntable 11, as shown in Fig. 8, or by contact with the upper face of one or more records on this turntable. The term turntable or turntable member as used in the accompanying claim is therefore intended to include the turntable per se with or without records thereon.

From the foregoing it will be seen that the angular arrangement and form of the wheels 60, 60a, 60b serves to drive the driven record at the same speed as the normal speed of the turntable in spite of slippage of these wheels and their added drag on the motor, whereby the succession of records are played at the same speed. Further, this step-up is accomplished without scuff or wear upon the wheels or records and by an arrangement of the wheels which also tends to prevent wandering of the supported record.

I claim as my invention:

In a disk record player, means for supporting the record to rotate in a non-vertical plane, comprising a plurality of wheels arranged with their axes directed generally toward the axis of rotation of said record and drivingly engaging the under face of said record to revolve and support it in said plane, said record resting on and being supported by gravity on said wheels, a turntable member arranged below said wheels generally concentric with said record, means for raising and lowering said wheels as a group in timed relation to the playing of a record to effect engagement and disengagement between the peripheries of said wheels and the upper face of said turntable member, comprising a sliding post supporting each of said wheels, means interconnecting said posts to raise and lower them in unison and cam means actuating said interconnecting means, means for rotating said turntable member to drive said wheels so engaged therewith, the axes of said wheels being angularly disposed with reference to the plane of said record to urge said record toward a greater angular speed than the angular speed of said turntable member, and a pickup arranged above said turntable member and below said record supported on said wheels and including a stylus engageable with the underside of said record.

PAUL F. WILBER.

REFERENCES CITED

The following references are of record in the file of this patent:

UNITED STATES PATENTS

| Number | Name | Date |
|---|---|---|
| 197,472 | Hunt | Nov. 27, 1877 |
| 1,547,768 | Little | July 28, 1925 |
| 2,132,801 | Perruca | Oct. 11, 1938 |

FOREIGN PATENTS

| Number | Country | Date |
|---|---|---|
| 541,156 | Great Britain | Nov. 14, 1941 |
| 111,950 | Sweden | July 27, 1944 |